United States Patent [19]

Fink et al.

[11] Patent Number: 4,801,648

[45] Date of Patent: Jan. 31, 1989

[54] MOLDING MATERIALS HAVING IMPROVED PROCESSING PROPERTIES, AND AGING-RESISTANT PLASTIC SHEETS PRODUCED FROM THESE MATERIALS

[76] Inventors: Roland Fink, Anwaenden 3, D-8026 Ebenhausen; Josef Huber-Hesselberger, Behringstrasse 113, D-8000 Muenchen 50; Maximilian Mayr, Frank-Caro-Strasse 63, D-8268 Garching, all of Fed. Rep. of Germany

[21] Appl. No.: 863,528

[22] Filed: May 15, 1986

[30] Foreign Application Priority Data

May 15, 1985 [DE] Fed. Rep. of Germany ....... 3517583

[51] Int. Cl.$^4$ ..................... C08L 25/12; C08L 33/10; C08L 27/06; C08L 51/00
[52] U.S. Cl. ......................... 525/74; 525/80; 525/64
[58] Field of Search ............................ 525/74, 80, 64

[56] References Cited

U.S. PATENT DOCUMENTS 3,661,994  5/1972  Hwa et al. ........................... 525/310
4,230,832  10/1980 Wei ..................................... 525/80

FOREIGN PATENT DOCUMENTS 0143321   6/1985  European Pat. Off. .
3342435   6/1985  Fed. Rep. of Germany .
54-139652 10/1979 Japan ..................................... 525/80
57-48542  6/1982  Japan .
1017533   1/1966  United Kingdom .................. 525/80

Primary Examiner—Allan M. Lieberman
Attorney, Agent, or Firm—Foley & Lardner, Schwartz, Jeffery, Schwaab, Mack, Blumenthal & Evans

[57] ABSTRACT

The present invention relates to molding materials and sheets which possess improved aging and contact properties, and which comprise a plastic blend based on an acrylate-grafted vinyl chloride polymer, preferably polyvinyl chloride, having an acrylate content of 30–60% by weight, preferably 35–50% by weight, based on 100 parts by weight of vinyl chloride polymer. The molding materials and sheets further comprise another polymer or polymer blend having a glass transition temperature greater than 30° C., preferably greater than 40° C., which is compatible with the vinyl chloride graft polymer. If necessary, additional fillers, processing agents and other conventional additives may be included, so long as 28–44.9% by weight, preferably 30–44.8% by weight, of the vinyl chloride polymer grafted with acrylate is present and 55.1–72% by weight, preferably 55.2–70% by weight, of the other polymer or polymer blend is present.

35 Claims, No Drawings

MOLDING MATERIALS HAVING IMPROVED PROCESSING PROPERTIES, AND AGING-RESISTANT PLASTIC SHEETS PRODUCED FROM THESE MATERIALS

BACKGROUND OF THE INVENTION

The present invention relates to molding materials having improved processing properties and to aging-resistant plastic sheets produced from these materials, in particular flexible deep-drawing sheets having improved aging behavior.

A very wide variety of webs and laminated sheets are known, such as those based on acrylonitrile/butadiene/styrene copolymers with plasticizer-containing polyvinyl chloride (PVC), laminated with rigid and soft PVC. Because of their plasticizer content, these sheets are considered to have the disadvantages that their resilience and low-temperature flexibility gradually declines over time; and that, on prolonged exposure to heat and light, even cracking of the surface can result.

On the other hand, rigid or hard polymers, such as rigid PVC have the disadvantage of great stiffness and poor low-temperature flexibility.

Yet heat-resistance and resistance to aging on exposure to light are critical performance characteristics for sheets, in particular deep-drawing sheets, for automobile trim components. The flexible but readily thermoformable trim panels, particularly used for dashboards, that contain acrylonitrile/butadiene/styrene, polyvinyl chloride and plasticizer components are relatively sensitive to oxidation, due to the sensitivity of their diene structure to oxidation effected by exposure to light energy and/or heat energy, and therefore fail also fully to meet the requirements of heat- and aging-resistance.

West German patent application No. P 33 42 435.7 discloses molding materials and sheets comprising (1) 45–90% by weight, preferably 50–85% by weight, of a polyvinyl chloride that is grafted with acrylate and that has an acrylate content of 30–60% by weight preferably 35–50% by weight (based on 100 parts by weight of PVC); and (2) 10–55% by weight, preferably 15–50% by weight, of another polymer or polymer blend that has a glass transition temperature greater than 70° C., preferably greater than 80° C., and is compatible with the PVC graft polymer. However, this broad class of disclosed molding materials and sheets, respectively, is not very advantageous in conjunction with soft foams and, for example, is not characterized by good contact characteristics.

SUMMARY OF THE INVENTION

It is therefore an object of the present invention to provide molding materials, and sheets or webs produced from those materials, that are based on or contain a vinyl chloride polymer, such as polyvinyl chloride, and that have improved deformation and relaxation properties.

It is also an object of the present invention to provide a deep-drawing sheet displaying improved aging characteristics that is suitable for use individually and in laminated structures, including structures comprising soft foams.

It is still another object of the present invention to provide a flexible sheet or web characterized by a softness and by contact properties that are superior to the corresponding properties of molding materials comprising the broad class of compositions disclosed by West German patent application No. P 33 42 435.7.

It has been discovered that these objects are achieved by the provision, in accordance with the present invention, of molding materials, and plastic sheets produced from these materials, comprising (A) specific amounts by weight of vinyl chloride polymer grafted with acrylate and, optionally, at least one vinyl chloride polymer mixed with a polyacrylate; and (B) specific amounts by weight of another polymer or polymer blend that has a glass transition temperature greater than 30° C., preferably greater than 40° C., and that is compatible with the acrylate-grafted vinyl chloride polymer. Component (A) has an acrylate content of 30–60% by weight, preferably 35–50% by weight, based on 100 parts by weight of vinyl chloride polymer. The molding material can also contain, as necessary, fillers, processing agents and other conventional additives.

In accomplishing the foregoing objects, there has thus been provided, in accordance with one aspect of the present invention, a molding material for the production of aging-resistant sheets, comprising (A) 28%–44.9% by weight of a first polymer comprising a vinyl chloride polymer grafted with acrylate, such that the first polymer has an acrylate content between about 30% and 60% by weight, based on 100 parts by weight of vinyl chloride polymer; and (B) 55.1% to 72% by weight of at least one second polymer, wherein component (B) has a glass transition temperature greater than 30° C. and is compatible with component (A).

In accordance with another aspect of the presently claimed invention, a molding material has been provided fo the production of aging-resistant sheets, comprising (A) 28% to 44.9% by weight of a first polymer comprising (i) up to 55 parts by weight of a vinyl chloride polymer grafted with acrylate, and (ii) up to 85 parts by weight of an admixture of (a) at least one vinyl chloride polymer and (b) a polyacrylate, such that the sum of components (i) and (ii) is 100 parts by weight and the first polymer has an acrylate content between about 30% and 60% by weight, based on 100 parts by weight of vinyl chloride polymer; and (B) 55.1% to 72% by weight of at least one second polymer, wherein component (B) has a glass transition temperature greater than 30° C. and is compatible with component (A).

There has also been provided a flexible sheet, having improved aging characteristics, that is comprised of either of the above-described molding materials.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

For the present invention, the preferred polymer for grafting with acrylate in component (A) is polyvinyl chloride, with the preferred acrylate being selected from $C_4$-to-$C_{10}$ acrylate esters, in particular butylacrylate. But the acrylate-grafted polymer can also be a vinyl chloride copolymer comprising minor amounts of monomers other than vinyl chloride. For example, a suitable vinyl chloride copolymer for use in the present invention can comprise up to 20% by weight, based on 100 parts by weight of the vinyl chloride copolymer, of vinylester, acrylonitrile, maleic acid, vinylidenehalide (such as vinylidene chloride) and/or olefin, e.g., alpha-olefin such as ethylene and propylene. The weight-percentage of monomers other than vinyl chloride is preferably between about 2 and 20 wt.%, particularly 3 and 18 wt.%.

The component (B) polymer or the polymer blend (hereinafter "the polymer blend") which has a glass transition temperature greater than 30° C., particularly greater than 40° C., is preferably a stryene/acrylonitrile (SAN) copolymer, a methylstyrene/acrylonitrile copolymer, a styrene/maleic anhydride copolymer, a polymethyl methacrylate (PMMA), or a copolymer of one or more acrylates with acrylonitrile, or is a blend of two or more of these polymers or copolymers. According to the present invention, it is preferred that the polymer blend additionally contain at least one copolymer or terpolymer that has a glass transition temperature of less than 60° C., preferably less than 50° C., and possesses polar groups. An ethylene copolymer or ethylene terpolymer possessing polar groups is particularly preferred.

In an especially preferred embodiment of the present invention, the polymer blend comprises (1) at least one SAN copolymer, one methylstyrene/acrylonitrile copolymer, one styrene/maleic anhydride copolymer, a PMMA and/or one copolymer of one or more acrylates with acrylonitrile, or a blend of two or more of these copolymers; and (2) at least one olefin copolymer or olefin terpolymer possessing polar groups, especially an ethylene copolymer or ethylene terpolymer possessing polar groups, and having a glass transition temperature of less than 60° C., preferably less than 50° C. In the preferred embodiment, the amount by weight of the polymer blend, namely, 55.1–72% by weight, preferably 55.2–70% by weight, is thus comprised of one or more olefin copolymers, preferably ethylene copolymers, possessing polar groups and having a glass transition temperature of less than 60° C., preferably less than 50° C., and at least one heat resistant polymer or copolymer from the group of a SAN copolymer, a methylstyrene/acrylonitrile copolymer, a styrene/maleic anhydride copolymer, a PMMA, and a copolymer of one or more acrylates with acrylonitrile, the weight ratio of the olefin copolymer(s) containing polar groups to the heat-resistant polymer or copolymer(s) being 4:1 to 1:4, preferably 3:1 to 1:3.

As previously noted, the present invention also relates to a sheet or web, in particular a flexible deep-drawing sheet or web having improved aging behavior, that comprises a blend based on (A) polyvinyl chloride which is grafted with acrylate and which has an acrylate content of 30–60% by weight, preferably 30–50% by weight (based on 100 parts by weight of PVC; and (B) another polymer or polymer blend, with the optional inclusion of fillers, processing assistants and other conventional additives.

In accordance with the present invention, the sheet consists of 28–44.9% by weight, preferably 30–44.8% by weight, of an acrylate-grafted vinyl chloride polymer, preferably PVC, and 55.1–72% by weight, preferably 55.2–70% by weight, of another polymer or polymer blend which has a glass transition temperature greater than 30° C., preferably greater than 40° C., and is compatible with the vinyl chloride graft polymer. In the sheet of the present invention, the polymer blend is likewise preferably a SAN copolymer, a methylstyrene/acrylonitrile copolymer, a styrene/maleic anhydride copolymer, a PMMA and/or a copolymer of one or more acrylates with acrylonitrile, or a blend of two or more of these polymers or copolymers. The polymer blend present in the sheet or web, or in the molding material, of the present invention additionally contains at least one copolymer or terpolymer possessing polar groups and having a glass transition temperature of less than 60° C., preferably less than 50° C. The polymer blend comprising the sheet therefore preferably contains at least one SAN copolymer, one methylstyrene/acrylonitrile copolymer, one styrene/maleic anhydride copolymer, one PMMA and/or one copolymer of one or more acrylates with acrylonitrile, or a blend of two or more of these copolymers, and at least one olefin copolymer or olefin terpolymer possessing polar groups. Particularly preferred for the olefin component is an ethylene copolymer or ethylene terpolymer possessing polar groups, and having a glass transition temperature of less than 60° C., preferably less than 50° C.

In keeping with the above description of one preferred embodiment of molding material within the present invention, the sheet or web produced from the material preferably comprises a polymer blend containing 55.1–72% by weight, especially 55.2–70% by weight, of (1) one or more olefin copolymers, preferably ethylene copolymers, possessing polar groups and having a glass transition temperature of less than 60° C., preferably less than 50° C., and (2) at least one of a SAN copolymer, a methylstyrene/acrylonitrile copolymer, a styrene/maleic anhydride copolymer, a PMMA, and a copolymer of one or more acrylates with acrylonitrile, the weight ratio of the olefin copolymer(s) of component (1) to the heat-resistant polymer(s) and/or copolymer(s) of component (2) being 4:1 to 1:4, preferably 3:1 to 1:3.

In another preferred embodiment of the molding material and of the sheet within the present invention, up to 85% by weight, preferably up to 45% by weight (based on 100 parts by weight of vinyl chloride polymer) of the vinyl chloride polymer grafted with acrylate is replaced with a blend of a vinyl chloride homopolymer and/or copolymer and a polyacrylate, which blend likewise has an acrylate content of 30–60% by weight, preferably 35–50% by weight (based on 100 parts by weight of vinyl chloride polymer). The vinyl chloride polymer grafted with acrylate is thus replaced with the same amount by weight of the above-mentioned blend.

The present invention is further described with reference to the following examples:

EXAMPLE 1

42.9% by weight of an acrylate-grafted polyvinyl chloride, 28.5% by weight of a methylstyrene/acrylonitrile copolymer, and 28.6% by weight of an ethylene/carbon monoxide/vinyl acetate terpolymer were calendered to give a 0.4 mm-thick sheet. The following properties were measured for this sheet, according to the appropriate DIN test standards:

| | |
|---|---|
| Shore hardness D DIN 53,505 after 10 seconds | 35 |

| | |
|---|---|
| Vicat softening point DIN 53,460, method A (°C.) | 50 |
| Tensile strength DIN 52,910 | |
| longitudinal (N/m²) | 14.4 |
| transverse | 13.6 |
| Elongation at break DIN 2,910 | |
| longitudinal (%) | 237 |
| transverse | 222. |

EXAMPLE 2

(Comparison)

55 parts by weight of an acrylate-grafted polyvinyl chloride having an acrylate content of about 40 wt.%, based on 100% by weight of acrylate-grafted PVC, 30 parts by weight of a styrene-acrylonitrile copolymer, and 15 parts by weight of an ethylene/carbon monoxide/vinyl acetate terpolymer having a CO content of about 12 wt.% and a vinyl acetate content of about 28 wt.% where calendered to form a 0.4 mm-thick sheet characterized by the following properties, when tested according to the above-mentioned DIN test standards:

| | |
|---|---|
| Shore hardness D | 56 |
| Vicat softening point (°C.) | 95 |
| Tensile strength | |
| longitudinal (N/m²) | 25.6 |
| transverse | 25.9 |
| Elongation at break | |
| longitudinal (%) | 275 |
| transverse | 300. |

According to West German application No. P 33 42 435.7, wherein the polymeric material of Example 2 is disclosed, only very high Shore hardness (D) values were obtained. The molding materials of the present invention, by contrast, display lower Shore hardness values, and sheets or webs formed therefrom have better flexibility and contact properties. This is particularly important for sheets that are used for finishing the interior of automotive passenger compartments.

What is claimed is:

1. A molding material for production of aging-resistant sheets, comprising in admixture:
  (A) 28% to 44.9% by weight of a first polymer comprising a vinyl chloride polymer grafted with acrylate, such that said first polymer has an acrylate content between about 30% and 60% by weight, based on 100 parts by weight of vinyl chloride polymer; and
  (B) 55.1% to 72% by weight of a polymer blend, wherein component (B) has a glass transition temperature greater than 30° C., is compatible with component (A), and is comprised of (i) at least one heat-resistant polymer or copolymer selected from the group consisting of a styrene/acrylonitrile copolymer, a methyl styrene/acrylonitrile copolymer, a styrene/maleic anhydride copolymer, a polymethyl methacrylate and an interpolymer of one or more acrylates with acrylonitrile and (ii) at least one of an olefin copolymer or an olefin terpolymer that has polar groups and a glass transition temperature of less than 60° C., such that said component B(ii) and said component B(i) are present in a weight ratio of between about 4:1 and 1:4.

2. A molding material as claimed in claim 1, wherein said acrylate content of component (A) is between 35% and 50% by weight.

3. A molding material as claimed in claim 1, wherein component (A) comprises 30% to 44.8% by weight of said molding material.

4. A molding material as claimed in claim 1, wherein component (B) comprises 55.2% to 70% by weight of said molding material.

5. A molding material as claimed in claim 1, wherein said glass transition temperature of component (B) is greater than 40° C.

6. A molding material as claimed in claim 1, wherein said component B(ii) has a glass transition temperature of less than 50° C.

7. A molding material as claimed in claim 1, wherein said olefin copolymer or said olefin terpolymer is comprised of at least one of an ethylene copolymer or an ethylene terpolymer that has polar groups and a glass transition temperature of less than 60° C.

8. A molding material according to claim 7, wherein said ethylene copolymer or said ethylene terpolymer has a glass transition temperature of less than 50° C.

9. A molding material according to claim 1, wherein said ratio is between 3:1 and 1:3.

10. A molding material according to claim 1, wherein said olefin copolymer is an ethylene copolymer or ethylene terpolymer.

11. A molding material as claimed in claim 1, wherein said vinyl chloride polymer grafted with acrylate is polyvinyl chloride.

12. A molding material as claimed in claim 1, wherein said vinyl chloride polymer grafted with acrylate comprises up to 20% by weight, based on 100 parts by weight of said vinyl chloride polymer, of at least one comonomer selected from the group consisting of vinylester, acrylonitrile, maleic acid, vinylidenehalide and olefin.

13. A molding material according to claim 1, wherein said acrylate is butyl acrylate.

14. A molding material for the production of aging-resistant sheets, comprising in admixture:
  (A) 28% to 44.9% by weight of a first polymer or copolymer comprising (i) up to 55 parts by weight of a vinyl chloride polymer or vinyl chloride copolymer of vinylester, acrylonitrile, maleic acid, vinylidene halide and olefin grafted with acrylate, and (ii) up to 85 parts by weight of an admixture of (a) a vinyl chloride polymer and (b) a polyacrylate, such that the sum of components (i) and (ii) is 100 parts by weight and said first polymer or copolymer has an acrylate content between about 30% and 60% by weight, based on 100 parts by weight of vinyl chloride polymer or vinyl chloride copolymer; and
  (B) 55.1% to 72% by weight of a polymer blend, wherein component (B) has a glass transition temperature greater than 30° C., is compatible with component (A), and is comprised of (i) at least one heat-resistant polymer or copolymer selected from the group consisting of a styrene/acrylonitrile copolymer, a methyl styrene/acrylonitrile copolymer, a styrene/maleic anhydride copolymer, a polymethyl methacrylate and an interpolymer of one or more acrylates with acrylonitrile; and (ii) at least one of an olefin copolymer and an olefin terpolymer that has polar groups and a glass transition temperature of less than 60° C., such that said olefin copolymer or terpolymer and said heat-resistant polymer or copolymer are present in a weight ratio of between about 4:1 and 1:4.

15. A molding material as claimed in claim 14, wherein said polymer (A) comprises up to 45 parts by weight of component A(ii).

16. A molding material as claimed in claim 14, wherein said vinyl chloride polymer grafted with acrylate is polyvinyl chloride.

17. A molding material as claimed in claim 14, wherein said vinyl chloride polymer grafted with acrylate comprises up to 20% by weight, based on 100 parts by weight of said vinyl chloride polymer, of at least one comonomer selected from the group consisting of vinylester, acrylonitrile, maleic acid, vinylidenehalide and olefin.

18. A flexible sheet having improved aging characteristics produced from the composition comprising in admixture:
 (A) 28% to 44.9% by weight of a first polymer comprising a vinyl chloride polymer or vinyl chloride copolymer of vinylester, acrylonitrile, maleic acid, vinylidenehalide and olefin grafted with acrylate, such that said first polymer has an acrylate content of between about 30% and 60% by weight, based on 100 parts by weight of vinyl chloride polymer or vinyl chloride copolymer; and
 (B) 55.1% to 72% by weight of a polymer blend, wherein component (B) has a glass transition temperature greater than 30° C., is compatible with component (A), and is comprised of (i) at least one heat-resistant polymer or copolymer selected from the group consisting of a styrene/acrylonitrile copolymer, a methyl styrene/acrylonitrile copolymer, a styrene/maleic anhydride copolymer, a polymethyl methacrylate and an interpolymer of one or more acrylates with acrylonitrile and (ii) at least one of an olefin copolymer or an olefin terpolymer that has polar groups and a glass transition temperature of less than 60° C., such that said component B(ii) and said component B(i) are present in a weight ratio of between about 4:1 and 1:4.

19. A sheet as claimed in claim 18, wherein said acrylate content of component (A) is between 35% and 50% by weight.

20. A sheet as claimed in claim 18, wherein component (A) comprises 30% to 44.8% by weight of said molding material.

21. A sheet as claimed in claim 18, wherein component (B) comprises 55.2% to 70% by weight of said molding material.

22. A sheet as claimed in claim 18, wherein said glass transition temperature of component (B) is greater than 40° C.

23. A sheet as claimed in claim 18, wherein said component B(ii) has a glass transition temperature of less than 50° C.

24. A sheet as claimed in claim 18, wherein said component B(ii) is comprised of at least one of an ethylene copolymer or an ethylene terpolymer that has polar groups and a glass transition temperature of less than 60° C.

25. A sheet as claimed in claim 24, wherein said ethylene copolymer or said ethylene terpolymer has a glass transition temperature of less than 50° C.

26. A sheet as claimed in claim 18, wherein said ratio is between 3:1 and 1:3.

27. A sheet as claimed in claim 18, wherein said olefin copolymer is an ethylene copolymer or ethylene terpolymer.

28. A sheet as claimed in claim 18, wherein said vinyl chloride polymer grafted with acrylate is polyvinyl chloride.

29. A sheet as claimed in claim 18, wherein said vinyl chloride polymer grafted with acrylate comprises up to 20% by weight, based on 100 parts by weight of said vinyl chloride polymer, of at least one selected from the group consisting of vinylester, acrylonitrile, maleic acid, vinylidenehalide and olefin.

30. a flexible sheet according to claim 18, wherein said acrylate is butyl acrylate.

31. A flexible sheet for the production of aging-resistant sheets produced from the composition comprising in admixture:
 (A) 28% to 44.9% by weight of a first polymer or copolymer comprising (i) up to 55 parts by weight of vinyl chloride polymer grafted with acrylate and (ii) up to 85 parts by weight of an admixture of (a) a vinyl chloride polymer and (b) a polyacrylate, such that the sum of components (i) and (ii) is 100 parts by weight and said first polymer or copolymer has an acrylate content between about 30% and 60% by weight, based on 100 parts by weight of vinyl chloride polymer or vinyl chloride copolymer; and
 (B) 55.1% to 72% by weight of at least one second polymer, wherein component (B) has a glass transition temperature greater than 30° C., is compatible with component (A), and is comprised of (i) at least one heat-resistant polymer or copolymer selected from the group consisting of a styrene/acrylonitrile copolymer, a methyl styrene/acrylonitrile copolymer, a styrene/maleic anhydride copolymer, a polymethyl methacrylate and a copolymer of one or more acrylates with acrylonitrile and (ii) at least one of an olefin copolymer and an olefin terpolymer that has polar groups and a glass transition temperature of less than 60° C., such that said component B(ii) and said component B(i) are present in a weight ratio of between about 4:1 and 1:4.

32. A flexible sheet as claimed in claim 31, wherein said polymer (A) comprises up to 45 parts by weight of component (ii).

33. A flexible sheet as claimed in claim 31, wherein said vinyl chloride polymer grafted with acrylate is polyvinyl chloride.

34. A flexible sheet as claimed in claim 31, wherein said vinyl chloride polymer grafted with acrylate comprises up to 20% by weight, based on 100 parts by weight of said vinyl chloride polymer, of at least one comonomer selected from the group consisting of vinylester, acrylonitrile, maleic acid, vinylidenehalide and olefin.

35. A flexible sheet according to claim 31, wherein said acrylate is butyl acrylate.

* * * * *